United States Patent Office 2,890,257
Patented June 9, 1959

2,890,257

METHOD OF STABILIZING ODORLESS NAPHTHAS DURING STORAGE

George W. Ayers, Chicago, and Walter J. Sandner, Carpentersville, Ill., assignors to The Pure Oil Company, Chicago, Ill., a corporation of Ohio No Drawing. Application December 28, 1955
Serial No. 555,787

9 Claims. (Cl. 260—683.48)

This invention relates to a method of stabilizing odorless naphthas during storage and, more particularly, to a method of inhibiting odor formation of heavy alkylates or fractions thereof during storage by maintaining in contact therewith a small amount of silica gel or activated alumina.

A problem of long standing has been the preparation of naphthas, particularly naphthas from heavy alkylates or fractions thereof, which are free of odor after treatment and which also remain odor-free during storage for extended periods of time. A particular naphtha or hydrocarbon mixture may have satisfactory odor characteristics after preparation and another batch from the same source and prepared in the same manner may be wholly unsuitable as an odorless naphtha. There are many processes disclosed in the prior art which relate to methods of removing odorous materials from hydrocarbon mixtures and which may be classified as sweetening processes wherein various sulfur, oxygen and nitrogen compounds identified with the odor accumulation are chemically modified, removed, or absorbed. The steps of these prior art methods, whether chemical or physical, when applied to alkylate fractions rarely produce an odorless material, and it has been found in accordance with this invention that even though a hydrocarbon mixture after such purification is odorless, on storage for considerable lengths of time this material decomposes to form undesirable odor and contamination.

Now, in accordance with the present invention, it has been found that these odorless naphthas, or odorless heavy alkylate fractions in particular, may be stabilized for exended periods of time by storage in the presence of small amounts of silica gel or activated alumina, or mixtures of same. An important aspect of the invention is that the silica gel or activated alumina appears to act, at least in part, as a negative catalyst for the odor formation since only a very small amount in the order of 0.001 to 0.1 weight percent based on the total naphtha is necessary to stabilize same for considerable periods of time against odor deterioration. Furthermore, in accordance with this invention the necessity for caustic-washing or water-washing steps prior to storage is eliminated and the original processing of the naphtha need not be particularly severe in order to obtain the results of the present invention. Accordingly, it is seen that naphthas which exhibit trace amounts of odor, or which are essentially odorless, may be stored in accordance with the method of this invention with satisfactory results.

The primary object of this invention, therefore, becomes the provision of a method for inhibiting the formation of odor or odor-producing decomposition in hydrocarbon mixtures, or heavy alkylates and fractions thereof, before use or during storage.

A second object of the invention is to provide a method for storing odorless naphthas or borderline materials, as far as odor is concerned, under conditions such that odor deterioration is inhibited.

A third object of the invention is to provide a method of inhibiting odor deterioration in naphthas, or heavy alkylates or fractions thereof, by storage in the presence of between about 0.001 to 0.1 weight percent of silica gel or activated alumina.

These and other objects of the invention will become apparent as the description thereof proceeds.

Before describing the invention in detail, it must be emphasized that the process herein does not relate to the removal of odor from naphthas or heavy alkylates which have already deteriorated to the point of being odorous, but rather is directed to the prevention or inhibition of odor formation during the storage of these materials which are already essentially odor-free but have a slight or decided tendency to go off-odor during storage or after preparation. Consequently, those processes in the prior art which are concerned with the treatment of cracked naphthas or naphthas containing sulfur compounds which are notoriously odorous have no bearing on this invention. This invention may be considered as related to the process described in copending application entitled, The Preparation of Odorless Naphthas Using Silica Gel, filed September 2, 1955, Serial Number 536,018, by G. W. Ayers and W. J. Sandner.

In carrying out the invention, it is only necessary to provide within the storage area of the naphtha or alkylate certain small specified amounts of silica gel or activated alumina in such a manner that the absorbent is in contact with at least a portion of the liquid. This may be accomplished in several ways. One method comprises the addition of 0.001 to 0.1 weight percent based on the total naphtha of silica gel or alumina into the storage tank so that it mixes thoroughly with the naphtha therein. Although the effectiveness of this small amount of absorbent has not been found to diminish with time, it may be desirable where a storage vessel is used for the storage of different hydrocarbon liquids from time to time, to provide means for easy removal of the silica gel or alumina when not used for naphthas. This may be accomplished by placing the small amount of silica gel or activated alumina in a porous or screened container which is lowered into the liquid naphtha in a storage tank, or affixed to the tank sidewall at a point below the liquid surface. Other mehods of maintaining the material in contact with liquid may be used. It is contemplated that under some conditions it may be advantageous to thoroughly mix the material with the naphtha as it goes to storage. This may be accomplished by injecting the required amount of silica gel or alumina into the feed line leading to the storage tank.

Although the invention may be applied to any hydrocarbon mixture broadly classifiable as a naphtha or fraction thereof boiling from 300° to 580° F., it is particularly applicable to heavy alkylates produced by the reaction of iso-paraffins or paraffins with iso-olefins or olefins with subsequent removal of the lower-boiling fraction wherein the problem of odor stabilization is particularly troublesome. The heavy alkylates boil in the range of about 340° to 580° F. and have API gravities ranging from about 55° to 51° or less and are prepared by the reaction of normal or branched chain paraffins with normal or branched chain olefins in the presence of an alkylation catalyst with ubsequent removal of the lower boiling portion of the alkylate by distillation. An entire heavy alkylate boiling, for example, in the range of about 340° to 540° F. may be treated in accordance with this invention. The present process is also applicable to any fraction or special cut obtained from the heavy alkylates. The following table sets forth three examples of heavy alkylate fractions and one specially distilled fraction of a heavy alkylate, giving the distillation characteristics of each.

TABLE I
*Distillation characteristics of heavy alkylates*

| Sample No. | API Gravity | IBP | 5% | 10% | 20% | 30% | 40% | 50% | 60% | 70% | 80% | 90% | 95% | E.P. | Percent Rec. | Percent Res. | Percent Loss | Odor |
|---|---|---|---|---|---|---|---|---|---|---|---|---|---|---|---|---|---|---|
| 1 | 54.0 | 347 | 354 | 356 | 358 | 360 | 363 | 366 | 369 | 374 | 383 | 414 | 466 | 517 | 98.0 | 1.6 | 0.4 | Slight (essentially odorless). |
| 2 | 54.5 | 354 | 356 | 357 | 359 | 361 | 363 | 365 | 368 | 372 | 380 | 404 | 451 | 516 | 98.9 | 1.1 | 0.0 | Do. |
| 3 | 52.3 | 358 | 366 | 368 | 370 | 372 | 375 | 379 | 383 | 392 | 410 | 467 | 518 | 537 | 98.3 | 1.0 | 0.7 | Do. |
| 4 | 55.2 | 348 | 352 | 353 | 355 | 356 | 357 | 359 | 361 | 363 | 365 | 370 | 377 | 406 | 98.8 | 1.2 | 0.0 | Odorless. |

Samples 1 and 2 were prepared by the alkylation of isobutane with isobutylene using hydrofluoric acid as the catalyst and subsequent removal of lower boiling hydrocarbons by distillation. Sample 3 was prepared from the same reactants as samples 1 and 2 using sulfuric acid as the catalyst. Sample 4 was prepared by the distillation (in the presence of nitrogen) of a portion of sample 1 under 2 mm. total pressure, and represented 75% by volume of the heavy alkylate charge. Sample 4 after distillation was essentially odorless.

In order to demonstrate the invention, a series of experiments were conducted using portions of samples 1 and 4 from the table. The silica gel used in these experiments was commercial silica gel (desiccant, activated), density of 40 to 50 lbs. per cubic foot, 28–200 mesh, as supplied by The Davison Chemical Company, Baltimore, Maryland. The alumina used in these experiments was the proprietary product known as Alorco activated alumina F–1, minus 100 mesh, obtained from the Aluminum Ore Company, East St. Louis, Illinois. Any of the large group of known activated silica gels and activated aluminas may be used in carrying out the invention. In the experiments, comparisons are made with and without the presence of the silica gel or alumina and also a comparison is made of a competitive odorless mineral spirits. Examples of suitable silica gels include grades 912, 922, 923, 950, 963, 70 and 35 as produced by the Davison Chemical Company. The activated alumina may be any commercial variety of this product generally used as a catalyst support and comprises essentially aluminum oxide with small amounts of water in chemical combination therewith. This material may be made by precipitating hydrous alumina from a solution of an aluminum salt and is activated by calcining at temperatures between 600 and 1200° F., temperatures of 600° to 700° F. being preferred. The commercial grade of activated alumina of 20 to 200 mesh is suitable for purposes of this invention.

An odorless naphtha was prepared by the distillation (in the presence of nitrogen) of the aforesaid heavy alkylate under 2 mm. total pressure. The distillate comprised 75% by volume of the heavy alkylate charge and was essentially odorless.

*Example 1.*—Fifty-cubic-centimeter samples of the aforementioned heavy alkylate (sample 1) and the freshly prepared odorless naphtha (sample 4), exhibiting essentially odor-free characteristics comparable to the best odorless naphtha marketed, were stored in four-ounce, cork-stoppered glass bottles in diffused light in the presence of air with 0.05% by weight of finely divided silica gel. Fifty-cubic-centimeter samples of the heavy alkylate and freshly prepared odorless naphtha were stored under the same conditions except that no silica gel was added. A fifty-cubic-centimeter sample of the best known, competitive, odorless mineral spirits was also stored under the same conditions without the addition of silica gel. The five samples were allowed to stand for seventy days at ordinary ambient temperatures. At the end of the storage period, the heavy alkylate and the odorless naphtha containing the silica gel had acquired no more than a very slight odor and were still of marketable quality. The heavy alkylate and the odorless naphtha stored without silica gel acquired sufficient odor to make them unmarketable. The sample of competitive naphtha stored without silica gel also acquired an extremely bad odor at the end of the test period.

*Example 2.*—Fifty-cubic-centimeter samples of the above described, essentially odorless, alkylate (sample 1) and odorless naphtha (sample 4) were stored in four-ounce, cork-stoppered bottles with 0.05 weight percent of finely divided activated alumina in diffused light and in the presence of air for a period of 70 days. At the end of this time both heavy alkylate and naphtha had developed no more than a slight odor and were still of marketable quality.

In the examples the storage tests were carried out using 0.05 weight percent of the silica gel or alumina based on the total amount of naphtha tested. One feature of the invention is the finding that very small amounts of silica gel or alumina or mixtures thereof, are sufficient to prevent the appearance of odor in the stored naphtha. To this end, as little as 0.001 weight percent of the silica gel or alumina may be used effectively. The use of 0.05 weight percent or as much as 0.1 weight percent is added assurance that the storage material will be odor free during storage for extended periods of time or during weather conditions which are conducive to odor deterioration of the naphtha. The silica gel or alumina does not appear to lose its effectiveness during use but since the amounts used are very small, regeneration or recovery is not warranted. This invention is not to be limited to any theories that may be applied thereto; however, it appears from a large number of experiments and experience with naphthas and odor formation therein that the silica gel and alumina act not only to absorb odorous bodies once formed but also prevent their formation by negative catalysis since an extremely small amount of the material effectively prevents odor formation.

Although the invention has been described in connection with certain alkylate fractions, it is not necessarily limited thereto and may be applied generally to hydrocarbon mixtures which are essentially odor-free but which have a decided tendency to go off-odor on storage for extended periods of time. Thus, various hydrocarbon fractions characterized as petroleum naphthas or mineral spirits in the art, boiling in the range of 300° to 580° F., or within the gasoline boiling range, may be treated in accordance with this invention. Also, various polymerization, isomerization, alkylation and hydrogenation products may be treated in accordance with this invention where the problem of odor inhibition or odor formation during long periods of standing is apparent. The process finds particular application in the treatment of heavy alkylates boiling in the range of about 340° to 580° F., produced by the catalytic reaction of olefins with paraffins, because these types of hydrocarbon mixtures are difficult to maintain in essentially odor-free condition during storage. These materials on storage, especially when they are prepared in the absence of silica gel or activated alumina, have a tendency to develop definite odors which on storage make them unmarketable.

Although the invention has been demonstrated by reference to various examples, these are merely illustrative and the only limitations attaching to the invention appear in the appended claims.

What is claimed is:

1. The method of inhibiting the formation of odor in essentially odor-free heavy alkylate hydrocarbon mixtures during storage which comprises maintaining between about 0.001 to 0.1 weight percent of at least one material selected from the group consisting of silica gel and activated alumina in contact with the liquid phase of said heavy alkylate hydrocarbon mixtures until same is withdrawn for use.

2. The method in accordance with claim 1 in which the absorbent is silica gel.

3. The method in accordance with claim 1 in which the absorbent is activated alumina.

4. The method in accordance with claim 1 in which the heavy alkylate is a petroleum naphtha boiling in the range of about 300° to 580° F.

5. The method in accordance with claim 1 in which the heavy alkylate boils in the range of about 340° to 580° F. and is formed by the acid alkylation of an iso-paraffin with an iso-olefin followed by removal of the lower boiling material by distillation.

6. The method in accordance with claim 5 in which the heavy alkylate is prepared from alkylate formed from the reaction of isobutane with isobutylene in the presence of hydrofluoric acid, and boils within the range of about 347° to 517° F.

7. The method in accordance with claim 6 in which the heavy alkylate has a boiling range of about 354° to 516° F.

8. The method in accordance with claim 5 in which the heavy alkylate has a boiling range of about 358° to 537° F., and was prepared from alkylate formed from the reaction of isobutane with isobutylene in the presence of sulfuric acid.

9. The method in accordance with claim 1 in which the heavy alkylate is a fraction boiling in the range of about 348° to 406° F. obtained from an original heavy alkylate boiling from about 347° F. to 517° F. and having an API gravity of about 54.0°, said distillation being carried out in an inert atmosphere and said original heavy alkylate being formed by the hydrofluoric acid alkylation of isobutane with isobutylene, and removal of the lower boiling material by distillation.

References Cited in the file of this patent

UNITED STATES PATENTS

| | | |
|---|---|---|
| 1,886,261 | Miller et al. | Nov. 1, 1932 |
| 2,060,091 | Lyman | Nov. 10, 1936 |
| 2,688,597 | Pott et al. | Sept. 7, 1954 |
| 2,754,254 | Hastings et al. | July 10, 1956 |
| 2,799,718 | Scovill et al. | July 16, 1957 |